United States Patent [19]
Breslin

[11] Patent Number: 5,944,011
[45] Date of Patent: *Aug. 31, 1999

[54] REFRACTIVE ENERGY WINDOW SYSTEM FOR HEATING AIR

[75] Inventor: Patrick William Breslin, Peoria, Ariz.

[73] Assignee: Bres LLC, Phoenix, Ariz.

[*] Notice: This patent is subject to a terminal disclaimer.

[21] Appl. No.: 08/805,722

[22] Filed: Feb. 25, 1997

[51] Int. Cl.[6] .................................................. E04D 13/18
[52] U.S. Cl. .......................... 126/633; 126/628; 126/629
[58] Field of Search .................................. 126/633, 628, 126/629, 632, 634, 669

[56] References Cited

U.S. PATENT DOCUMENTS

| | | | |
|---|---|---|---|
| 4,076,013 | 2/1978 | Bette ...................................... | 126/620 |
| 4,239,035 | 12/1980 | Brooks et al. .......................... | 126/634 |
| 4,271,823 | 6/1981 | Erb .......................................... | 126/669 |
| 4,426,999 | 1/1984 | Evans et al. ............................ | 126/669 |
| 5,645,045 | 7/1997 | Breslin .................................... | 126/669 |

*Primary Examiner*—Larry Jones
*Attorney, Agent, or Firm*—Harry M. Weiss; Harry M. Weiss & Associates, P.C.

[57] ABSTRACT

A refractive energy window system which uses light energy to heat the air. The system has a solar panel which focuses the light energy on the air when the air passes through the solar panel. A frame structure is used to support and hold the solar panel. The frame has an input section which draws the air into the solar panel and an output section which outputs the air after the air has passed through the solar panel and has been heated by the light energy.

27 Claims, 2 Drawing Sheets

REFRACTIVE ENERGY WINDOW SYSTEM FOR HEATING AIR

RELATED APPLICATIONS

This U.S. Patent Application is related to U.S. Patent Application entitled "FLUID HEATING APPARATUS USING LIGHT ENERGY AND METHOD THEREFOR," Ser. No. 08/458,694, filed Jun. 2, 1995 now U.S. Pat. No. 5,645,045, issued Jul. 8, 1977, in the name of the same Inventor as this U.S. Patent Application, and is incorporated herein by reference.

BACKGROUND OF THE INVENTION

1. Field of the Invention

This invention relates generally to solar panels and, more specifically, to a cost effective refractive energy window system which uses a lens to intensify the light energy from the sunlight to heat a gas (i.e., air).

2. Description of the Prior Art

Recently, a tremendous effort has been made to develop alternative energy sources. Many of these efforts have been directed towards the development of a commercially acceptable solar energy collector system. While current solar energy collector systems do work, there are several problems associated with these systems. The biggest problem is the cost associated with these systems. Current solar panels are fairly expensive to produce. Not only is the cost relatively high to produce a solar panel, but the cost to maintain the system is also fairly high.

Current solar energy collector systems are also not very durable. These systems tend to break down fairly often even in ideal operating conditions. As such, an owner of a solar energy collector system is constantly installing new solar panels or repairing the old panels in order for the system to continuously operate.

Current solar energy collector systems are also not very efficient when the sun is not directly above the panel. As such, when the sun moves from its peak position relative to the solar panel, the solar energy collector system becomes less and less efficient. Thus, a longer period of time is required in order for the device to heat a substance.

Therefore, a need existed to provide an improved solar energy collector system. The improved solar energy collector system will be a refractive energy window system which uses light energy to heat a gas (i.e., air). The improved solar energy collector system must be relatively inexpensive to build and maintain. The improved solar energy collector system must also be extremely reliable and durable even in harsh conditions. The improved solar energy collector system must also be more efficient than current devices. The improved solar energy collector system must be capable of heating the air even if the sun is not directly above the solar panel.

SUMMARY OF THE INVENTION

In accordance with one embodiment of the present invention, it is an object of the present invention to provide an improved solar energy collector system.

It is another object of the present invention to provide an improve solar energy collector system which will be a refractive energy window system which uses light energy to heat a gas (i.e., air).

It is another object of the present invention to provide an improved solar energy collector system which is relatively inexpensive to build and maintain.

It is still another object of the present invention to provide an improved solar energy collector system that is extremely reliable and durable even in harsh conditions.

It is still a further object of the present invention to provide an improved solar energy collector system that is more efficient than current solar collector systems.

It is yet another object of the present invention to provide an improved solar energy collector system that is capable of heating the air even if the sun is not directly above the solar panel.

BRIEF DESCRIPTION OF THE PREFERRED EMBODIMENTS

In accordance with one embodiment of the present invention, a refractive energy window system using light energy to heat a gas is disclosed. The refractive energy window system uses a solar panel to focus the light energy on the gas when the gas passes through the solar panel. A frame is used to support the solar panel. The frame has an input section for drawing the gas into the solar panel and an output section for outputting the gas after the gas has passed through the solar panel and has been heated by the light energy.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
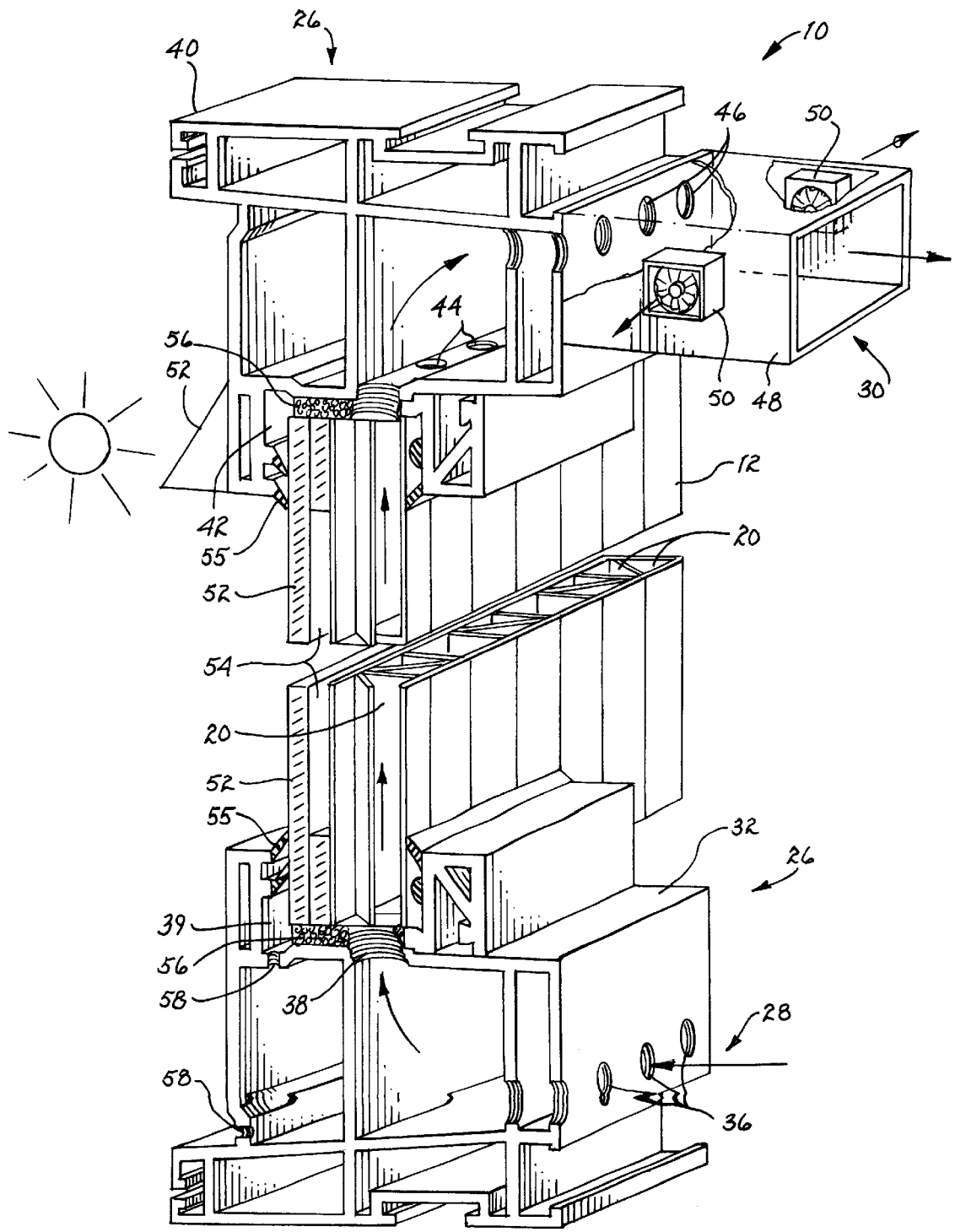
FIG. 1 is an elevated perspective view of the refractive energy window system of the present invention.

Referring to FIG. 1, a refractive energy window system 10 (hereinafter system 10) is shown. The system 10 uses light energy to heat a gas (i.e., air) that flows through the system 10.

The system 10 has a solar panel 12. The solar panel 12 focuses light energy from the sun on the air as the air passes through the solar panel 12 in order to heat the air. Referring now to FIGS. 1–4, wherein like numerals and symbols represent like elements, several different embodiments of the solar panel 12 are shown. The solar panel 12 uses a lens 14 for focusing the light energy from the sun on the air as the air passes through the solar panel 12. No matter what the position of the sun is relative to the system 10, the lens 14 will focus the light energy from the sun on the air to be heated. This makes the system 10 simpler and more efficient than current solar devices which must rotate in order to keep the solar device perpendicular to the sun light. The lens 14 also intensifies the magnitude of the light energy thereby allowing the system 10 to heat the air more efficiently and quicker than current solar collector systems.

A body section 16 is coupled to the lens 14. The body section 16 defines a gas tight tubular passage in which the gas to be heated flows. The lens 14 focuses the light energy from the sun on the air and heats the air as the air passes through the tubular passageway. A plurality of walls 18 are coupled to the lens 14 and the body section 16. The walls 18 define a plurality of channels 20 within the tubular passage in which the air being heated flows.

Figure 2:
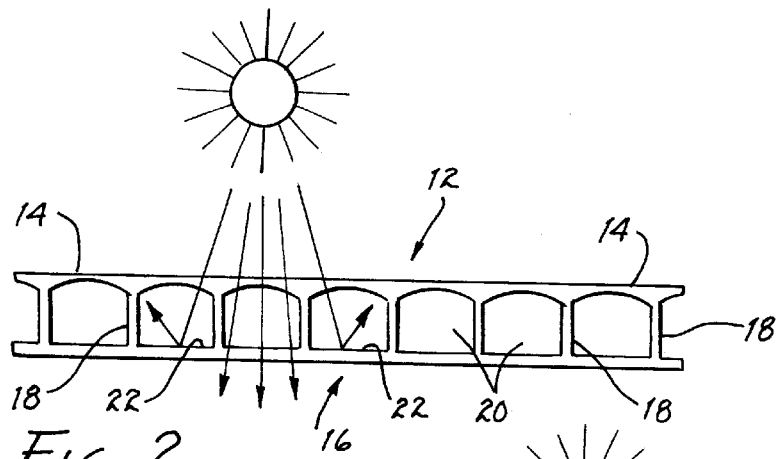
FIG. 2 is a side view of one embodiment of a solar panel section which is used in the refractive energy window system depicted in FIG. 1.
Figure 3:
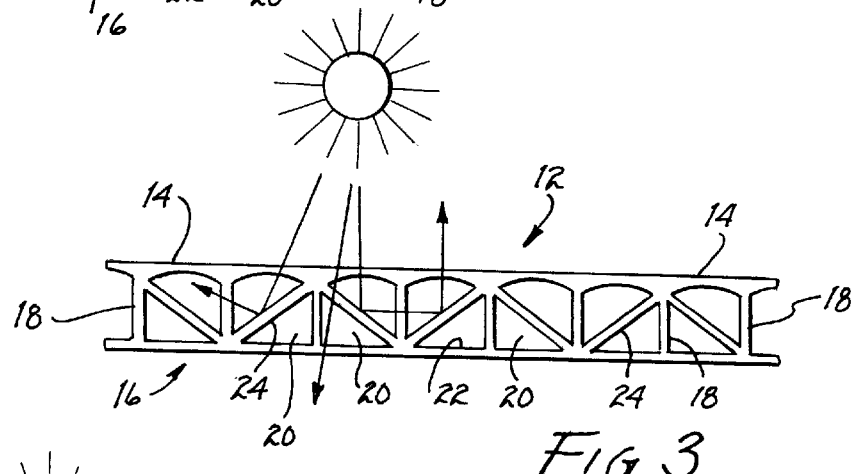
FIG. 3 is a side view of a second embodiment of a solar panel section which is used in the refractive energy window system depicted in FIG. 1.
Figure 4:
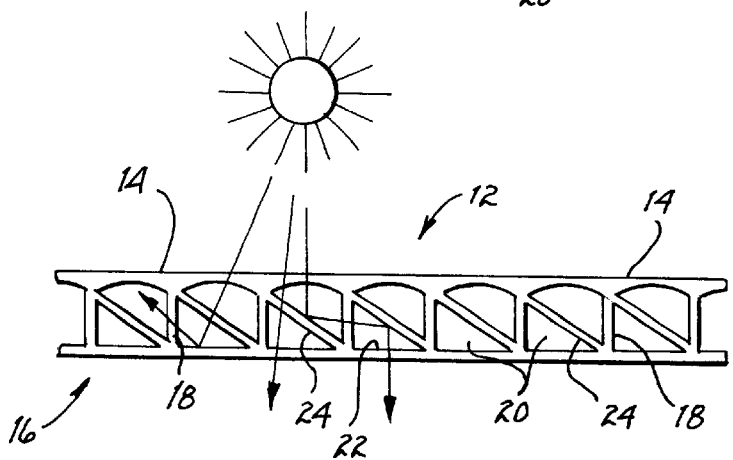
FIG. 4 is a side view of a third embodiment of a solar panel section which is used in the refractive energy window system depicted in FIG. 1.

As can be seen more clearly in FIGS. 2–4, each channel 20 has a lens 14 which focuses and intensifies the light energy from the sun directly on the air flowing through each of the plurality of channels 20. The bottom section of each channel also has refractive elements 22. The refractive elements 22 on the bottom section refracts the light energy through a greater distance of the plurality of channels 20. This increases the adsorption of the light energy by the air within each channel 20.

As may be seen in FIGS. 3 and 4, in accordance with one embodiment of the present invention, each of the plurality of channels 20 may further have refractive walls 24. The refractive walls 24 are coupled to each of the plurality of walls 18 for refracting the light energy through even a greater distance of each of the plurality of channels 20. This increases the adsorption of the light energy by the air flowing through each of the plurality of channels 20.

The lenses 14, the body section 16, the plurality of walls 16, and the refractive walls 24 may be made from a translucent plastic material, polycarbonate sheets, or similar material. These types of materials have a refractive property and are translucent. This allows some of the light energy to be refracted thereby allowing the air moving through the solar panel 12 to absorb more energy, while further allowing some of the sun light to be transmitted through the solar panel 12. As such, the system 10 may be used in many different applications such as sky lights, Arizona rooms, atriums, etc.

Referring now specifically to FIG. 1, the solar panel 12 is supported by a frame structure 26. The frame structure 26 has an input section 28 for drawing the air into the solar panel 12 and an output section 30 for outputting the air after the air has passed through the solar panel 12 and has been heated by the light energy of the sun.

The frame structure 26 is comprised of a hollow tubular structure bottom section 32 (hereinafter bottom section 32). The bottom section 32 has a channelling 34 running along a top potion of the bottom section 32. The channelling 34 is used to support and hold the solar panel 12. A plurality of openings 36 are drilled through a side portion of the bottom section 32. The plurality of openings 36 are used for drawing air into the system 10 so that the air may be heated by the light energy of the sun. A second plurality of openings 38 are drilled through the channelling 34 into the bottom section 32. The second plurality of openings 38 are used for allowing the air that is drawn into the bottom section 32 to flow into the solar panel 12 so that the air may be heated by the light energy. In the preferred embodiment of the present invention, each of the plurality of channels 20 has a separate opening 38. This will allow the air that was drawn into the system 10 to be evenly distributed to each of the plurality of channels 20 so that the air may be heated by the light energy.

The frame structure 26 also has a hollow tubular structure top section 40 (hereinafter top section 40). The top section 40 has a channelling 42 running along a bottom potion of the top section 40. The channelling 42 is used for holding and supporting the solar panel 12. The channelling 42 has a plurality of openings 44 drill therethrough into the top section 40. The openings 44 allow the air that was heated by the solar panel 12 to flow out of the solar panel 12 into the top section 40. In the preferred embodiment of the present invention, each of the plurality of channels 20 has a separate opening 44 which allows the air that was heated in each channel 20 of the solar panel 12 to flow out of the solar panel 12 and into the top section 40. A second plurality of openings 46 are drill through a side portion of the top section 40. The second plurality of openings 46 allows the air which was heated by the solar panel 12 to exit the top section 40.

A duct 48 is coupled to the top section 40 and to the second plurality of openings 46. The duct 48 provides a passage way to distribute the heated air that exits the system 10 to other areas of a building where the system 10 may be installed.

Circulating fans 50 are coupled to the duct 48. The circulating fans 50 are used for drawing and moving the air through the system 10. The circulating fans 50 may be powered by any conventional manner. In accordance with one embodiment of the present invention, a solar cell panel 52 is coupled to the frame structure 26 and to the circulating fans 50. The solar cell panel 52 is used to collect light energy and to convert the light energy to electrical power to operate the circulating fans 50. In the preferred embodiment of the present invention, photovoltaic cells are used in the solar cell panel 52.

The system 10 has numerous insulating elements in order to increase the efficiency of the system 10 and to ensure that the system 10 is reliable and durable even in harsh weather conditions. An outer window glazing 52 is positioned in the channelling 34 and 42 of the bottom and the top sections 32 and 40 respectively of the frame structure 26. The outer window glazing 52 is positioned in front of the solar panel 12 such that an air pocket 54 is formed between the outer window glazing 52 and the solar panel 12. The outer window glazing 52 and the air pocket 54 are used to protect the solar panel 12 against outside air which may damage the solar panel 12. The outer window glazing 52 and the air pocket 54 are also used to prevent outside air from getting into the system 10. If outside air is allowed in the system 10, the overall efficiency of the system 10 will decrease.

Weather stripping 55 is also used in the system 10. The weather stripping 55 is coupled to the frame structure 26. When the outer window glazing 52 is installed, the weather stripping produces an air tight seal between the outer window glazing 52 and the frame structure 26. This prevents outside air from entering the system 10 between the frame structure 26 and the outer window glazing 52. This will protect and increase the efficiency of the system 10.

Foam insulation 56 is also positioned in the channelling 34 and 42 of the bottom and the top sections 32 and 40 respectively of the frame structure 26. The foam insulation 56 is positioned between the frame structure 26 and the solar panel 12 and between the frame structure 26 and the outer window glazing 52. The foam insulation 56 is used to increase the efficiency of the system 10 by preventing outside air from leaking into the system 10 and by preventing the air that is drawn into the system 10 from leaking out of the system 10.

When the light energy heats up the air in the solar panel 12, condensation may form within the system 10. For this reason, condensation holes 58 are drilled in the bottom section 32 of the frame structure 26. The condensation holes 58 will allow the condensation which may have built up in the solar panel 12 to be drained from the system 10.

OPERATION

When the circulating fans 50 are activated, the air is drawn through the first plurality of openings 36 into the bottom section 32 of the frame structure 26. The air is then distributed through the second plurality of openings 38 to the plurality of channels 20 of the solar panel 12. As the air travels through the solar panel 12, the light energy from the sun increases the temperature of the air. The lenses 14 of the solar panel 12 focus the light energy from the sun on the air and heats the air as the air passes through the solar panel 12. The refractive elements 22 on the bottom section of each channel 20, as well as the refractive wall 24, refract the light energy through a greater distance of the plurality of channels 20. This increases the adsorption of the light energy by the air within each channel 20. The circulating fans 50 then draw the heated air out of the solar panel 12 and into the top section 40 of the frame structure 26 through the plurality of openings 44. The heated air then exits the top section 40 of the frame structure 26 through the plurality of openings 46 into the duct 48 where the heated air may then be distributed throughout the building where the system 10 is installed.

While the invention has been particularly shown and described with reference to preferred embodiments thereof, it will be understood by those skilled in the art that the foregoing and other changes in form, and details may be made therein without departing from the spirit and scope of the invention.

I claim:

1. A refractive energy window system using light energy to heat a gas comprising, in combination:
    a solar panel which focuses said light energy on said gas when said gas passes through said solar panel; and
    a frame for supporting said solar panel wherein said frame has an input section for drawing said gas into said solar panel and an output section for outputting said gas after said gas has passed through said solar panel and has been heated by said light energy.

2. A refractive energy window system in accordance with claim 1 further comprising a circulating fan coupled to said output section of said frame for drawing said gas into said solar panel and for outputting said gas after said gas has passed through said solar panel and been heated by said light energy.

3. A refractive energy window system in accordance with claim 1 further comprising an outer window glazing coupled to a front section of said solar panel for insulating and protecting said solar panel against outside air.

4. A refractive energy window system in accordance with claim 3 further comprising insulation between said frame and said solar panel and between said frame and said outer window glazing for preventing said outside air from leaking into said refractive energy window system and for preventing said gas being heated by said refractive energy window system from leaking out of said refractive energy window system.

5. A refractive energy window system in accordance with claim 4 further comprising an insulation air space between said solar panel and said outer window glazing for insulating and protecting said solar panel against said outside air.

6. A refractive energy window system in accordance with claim 1 wherein said solar panel comprises:
    a lens for focusing said light energy on said gas to be heated; and
    a body section coupled to said lens for defining a gas tight tubular passage in which said gas to be heated flows.

7. A refractive energy window system in accordance with claim 6 further comprising a plurality of walls coupled to said lens and said body section for defining a plurality of channels within said tubular passage in which said gas being heated by said light energy flows.

8. A refractive energy window system in accordance with claim 7 wherein said lens comprises a plurality of lenses for focusing said light energy on said gas flowing through each of said plurality of channels.

9. A refractive energy window system in accordance with claim 6 wherein said body section comprises refractive elements for refracting said light energy through a greater distance of said tubular passage increasing adsorption of said light energy by said gas within said tubular passage.

10. A refractive energy window system in accordance with claim 7 wherein each of said plurality of channels further comprises refractive elements coupled to each of said plurality of walls defining each of said plurality of channels for refracting said light energy through a greater distance of each of said plurality of channels increasing adsorption of said light energy by said gas flowing through each of said plurality of channels.

11. A refractive energy window system in accordance with claim 10 wherein said lens, said body section, said plurality of walls, and said refractive elements are made of a translucent plastic material.

12. A refractive energy window system in accordance with claim 10 wherein said lens, said body section, said plurality of walls, and said refractive elements are made of polycarbonate sheets.

13. A refractive energy window system in accordance with claim 2 further comprising solar cells coupled to said frame and to said circulating fan for collecting said light energy to power said circulating fan.

14. A refractive energy window system in accordance with claim 13 wherein said solar cells are photovoltaic cells.

15. A refractive energy window system in accordance with claim 1 wherein said frame comprises:
    a hollow tubular structure bottom section comprising:
        a first plurality of openings therethrough a side portion of said hollow tubular structure bottom section for drawing said gas to be heated into said hollow tubular structure bottom section;
        channelling running along a top potion of said hollow tubular structure bottom section for holding said solar panel; and
        a second plurality of openings therethrough said channelling into said hollow tubular structure bottom section for allowing said gas drawn into said hollow tubular structure bottom section to flow into said solar panel to be heated by said light energy; and
    a hollow tubular structure top section comprising:
        channelling running along a bottom potion of said hollow tubular structure top section for holding said solar panel;
        a first plurality of openings therethrough said channelling into said hollow tubular structure top section for allowing said gas that is heated by said solar panel to flow out of said solar panel into said hollow tubular structure top section; and
        a second plurality of openings therethrough a side portion of said hollow tubular structure top section for allowing said gas which was heated by said solar panel to exit said hollow tubular structure top section.

16. A refractive energy window system in accordance with claim 15 wherein said hollow tubular structure bottom section further comprises condensation holes for draining condensation which has built up on said refractive energy window system.

17. A refractive energy window system in accordance with claim 15 wherein said hollow tubular structure top section further comprises a duct coupled to said second plurality of openings and having said circulating fan coupled thereto for providing a passage way for said gas which was heated by said solar panel to exit said refractive energy window system.

18. A refractive energy window system using light energy to heat a gas comprising, in combination:

a solar panel which focuses said light energy on said gas when said gas passes through said solar panel, wherein said solar panel comprises:

a lens for focusing said light energy on said gas to be heated;

a body section coupled to said lens for defining a gas tight tubular passage in which said gas to be heated flows;

a plurality of walls coupled to said lens and said body section for defining a plurality of channels within said tubular passage in which said gas being heated by said light energy flows, wherein each of said plurality of channels has said lens for focusing said light energy on said gas flowing through each of said plurality of channels; and refractive elements coupled to said body section and to each of said plurality of walls for refracting said light energy through a greater distance of each of said plurality of channels increasing adsorption of said light energy by said gas flowing through each of said plurality of channels;

a frame for supporting said solar panel wherein said frame has an input section for drawing said gas into said solar panel and an output section for outputting said gas after said gas has passed through said solar panel and has been heated by said light energy, wherein said frame comprises:

a hollow tubular structure bottom section comprising:

a first plurality of openings therethrough a side portion of said hollow tubular structure bottom section for drawing said gas to be heated into said hollow tubular structure bottom section;

channelling running along a top potion of said hollow tubular structure bottom section for holding said solar panel; and a second plurality of openings therethrough said channelling into said hollow tubular structure bottom section for allowing said gas drawn into said hollow tubular structure bottom section to flow into said solar panel to be heated by said light energy; and a hollow tubular structure top section comprising:

channelling running along a bottom potion of said hollow tubular structure top section for holding said solar panel;

a first plurality of openings therethrough said channelling into said hollow tubular structure top section for allowing said gas heated by said solar panel to flow out of said solar panel into said hollow tubular structure top section; and a second plurality of openings therethrough a side portion of said hollow tubular structure top section for allowing said gas which was heated by said solar panel to exit said hollow tubular structure top section; and a circulating fan coupled to said output section of said frame for drawing said gas into said solar panel and outputting said gas after said gas has passed through said solar panel and has been heated by said light energy.

19. A refractive energy window system in accordance with claim 18 further comprising an outer window glazing coupled to a front section of said solar panel for insulating and protecting said solar panel against outside air.

20. A refractive energy window system in accordance with claim 19 further comprising insulation between said frame and said solar panel and between said frame and said outer window glazing for preventing said outside air from leaking into said refractive energy window system and for protecting said gas heated by said refractive energy window system from leaking out.

21. A refractive energy window system in accordance with claim 20 further comprising an insulation air space between said solar panel and said outer window glazing for insulating and protecting said solar panel against said outside air.

22. A refractive energy window system in accordance with claim 18 wherein said lens, said body section, said plurality of walls, and said refractive elements are made of a translucent plastic material.

23. A refractive energy window system in accordance with claim 18 wherein said lens, said body section, said plurality of walls, and said refractive elements are made of polycarbonate sheets.

24. A refractive energy window system in accordance with claim 18 wherein said hollow tubular structure bottom section further comprises condensation holes for draining condensation which has built up on said refractive energy window system.

25. A refractive energy window system in accordance with claim 18 wherein said hollow tubular structure top section further comprises a duct coupled to said second plurality of openings and having said circulating fan coupled thereto for providing a passage way for said gas which was heated by said solar panel to exit said refractive energy window system.

26. A refractive energy window system in accordance with claim 18 further comprising solar cells coupled to said frame and to said circulating fan for collecting said light energy to power said circulating fan.

27. A refractive energy window system in accordance with claim 26 wherein said solar cells are photovoltaic cells.

* * * * *